UNITED STATES PATENT OFFICE.

SALOMON HEIMANN, OF NEW YORK, N. Y., ASSIGNOR, BY DIRECT AND MESNE ASSIGNMENTS, TO LUCAS TOCH, HERMAN MAYER, AND P. C. RALLI, OF SAME PLACE.

SUBSTITUTE FOR GUTTA-PERCHA.

SPECIFICATION forming part of Letters Patent No. 663,572, dated December 11, 1900.

Application filed February 8, 1900. Serial No. 4,448. (No specimens.)

*To all whom it may concern:*

Be it known that I, SALOMON HEIMANN, a citizen of Germany, and a resident of the city of New York, borough of Manhattan, in the county of New York and State of New York, have invented certain new and useful Improvements in Substitutes for Gutta-Percha, of which the following is a specification.

The object of this invention is to provide a new and improved substitute for gutta-percha for use in electric cables, which substitute is cheap, is a perfect insulator of electricity, is water and acid proof, flexible, and can readily be applied on cables and electric conductors of all kinds.

My improved substitute for gutta-percha is composed of a mixture of pulverized peat and resin-oil, a well-known article of commerce.

The peat is first dried thoroughly and then pulverized and sifted until it has about the consistency of flour. The pulverized peat is mixed with equal parts, by weight, of resin-oil, and this mixture is stirred and worked until it has about the consistency of dough and is then shaped into suitable blocks or strips and dried and while drying assumes a semihardness like ordinary gutta-percha.

To facilitate making the mixture and for the purpose of giving the resin greater binding powers, I add about two per cent. amyl acetate to the pulverized peat and resin-oil while mixing them.

If greater elasticity of the mixture is desired, from ten to fifteen per cent. of rubber may be added to the mixture while mixing.

For coating cables the mixture is first softened by heat and then applied in the well-known manner.

For covering individual wires twenty-five per cent. of pulverized peat is mixed with seventy-five per cent. of resin-oil, as for this purpose a greater state of liquidity of the mixture is necessary.

Having described my invention, what I claim as new, and desire to secure by Letters Patent, is—

A substitute for gutta-percha consisting of finely-pulverized peat, resin-oil and amyl acetate about in the proportions given.

Signed at New York, in the county of New York and State of New York, this 5th day of February, A. D. 1900.

SALOMON HEIMANN.

Witnesses:
OSCAR F. GUNZ,
N. M. FLANNERY.